Feb. 23, 1926.
G. E. SHELDRICK
MAIL STAMPING MACHINE
Filed April 30, 1923 9 Sheets-Sheet 6
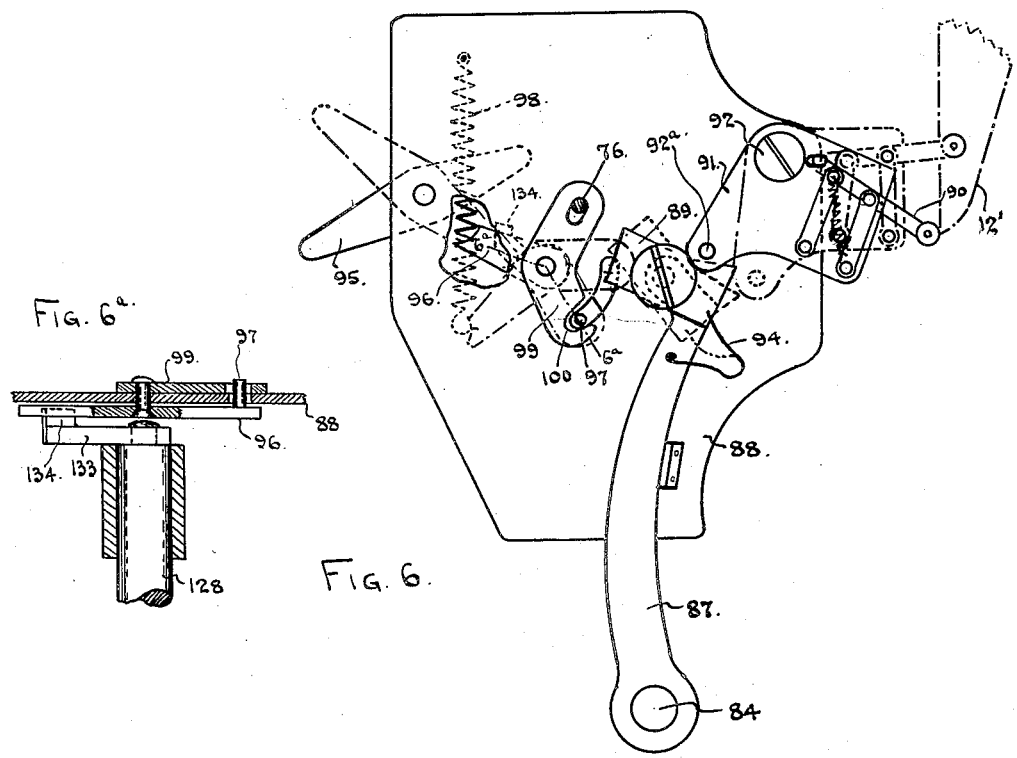
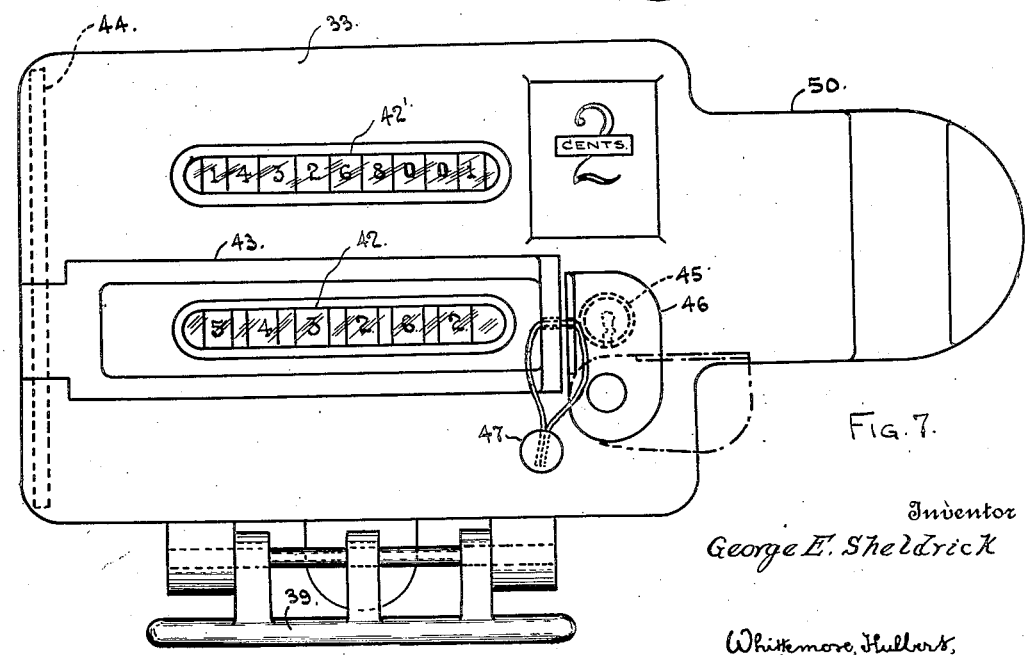
Inventor
George E. Sheldrick
Whittemore, Hulbert,
Whittemore, and Belknap
Attorneys

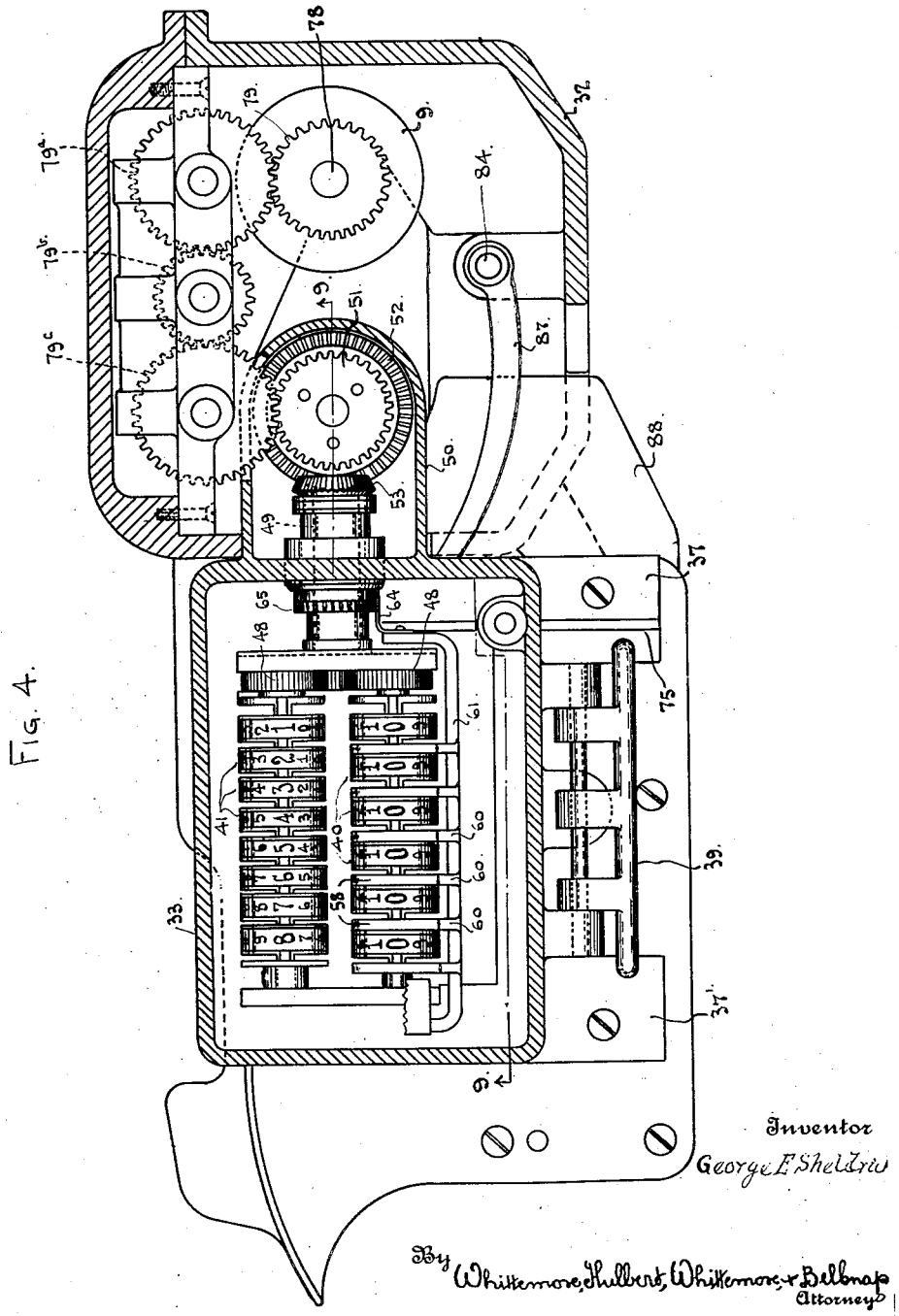

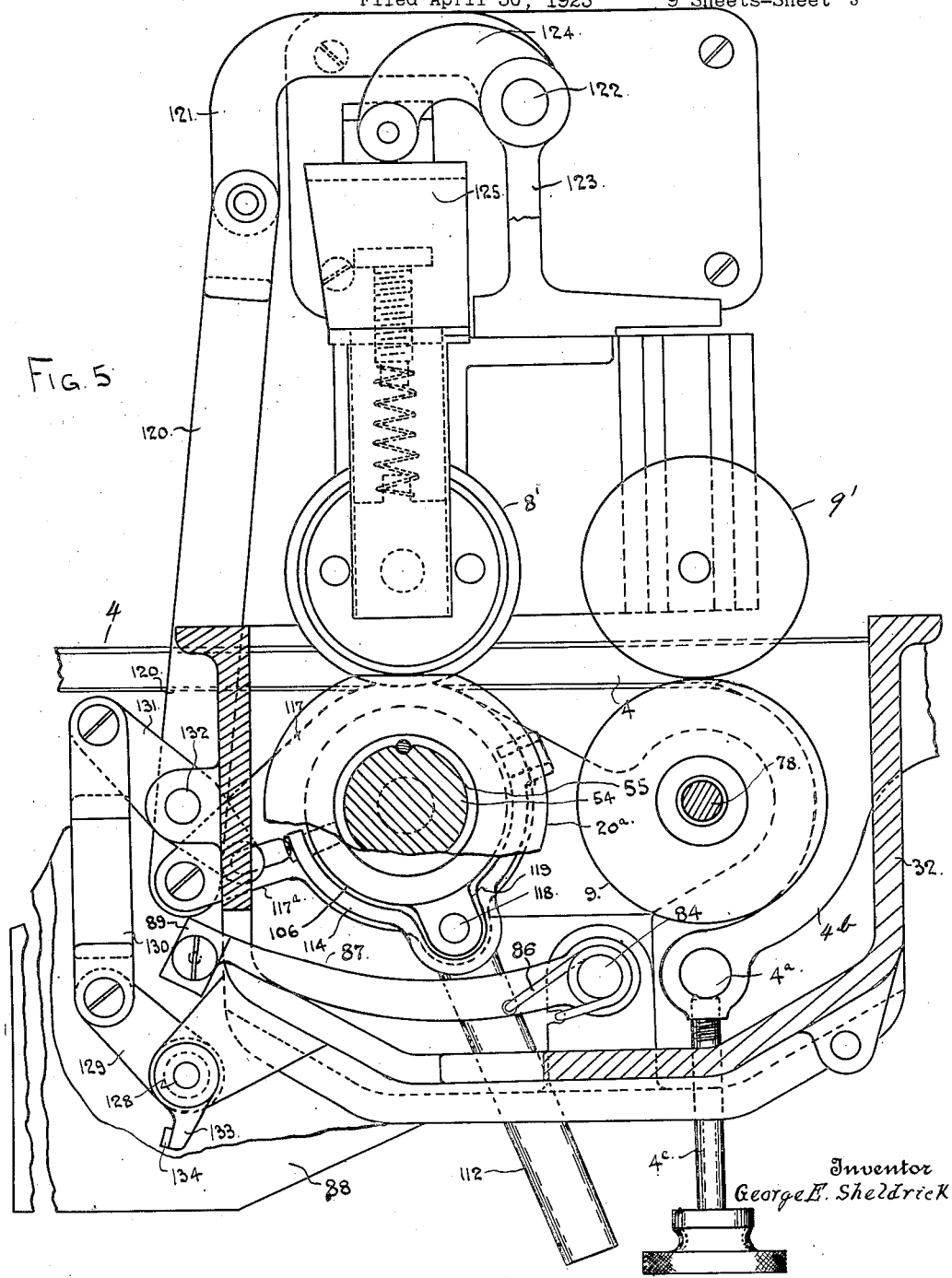

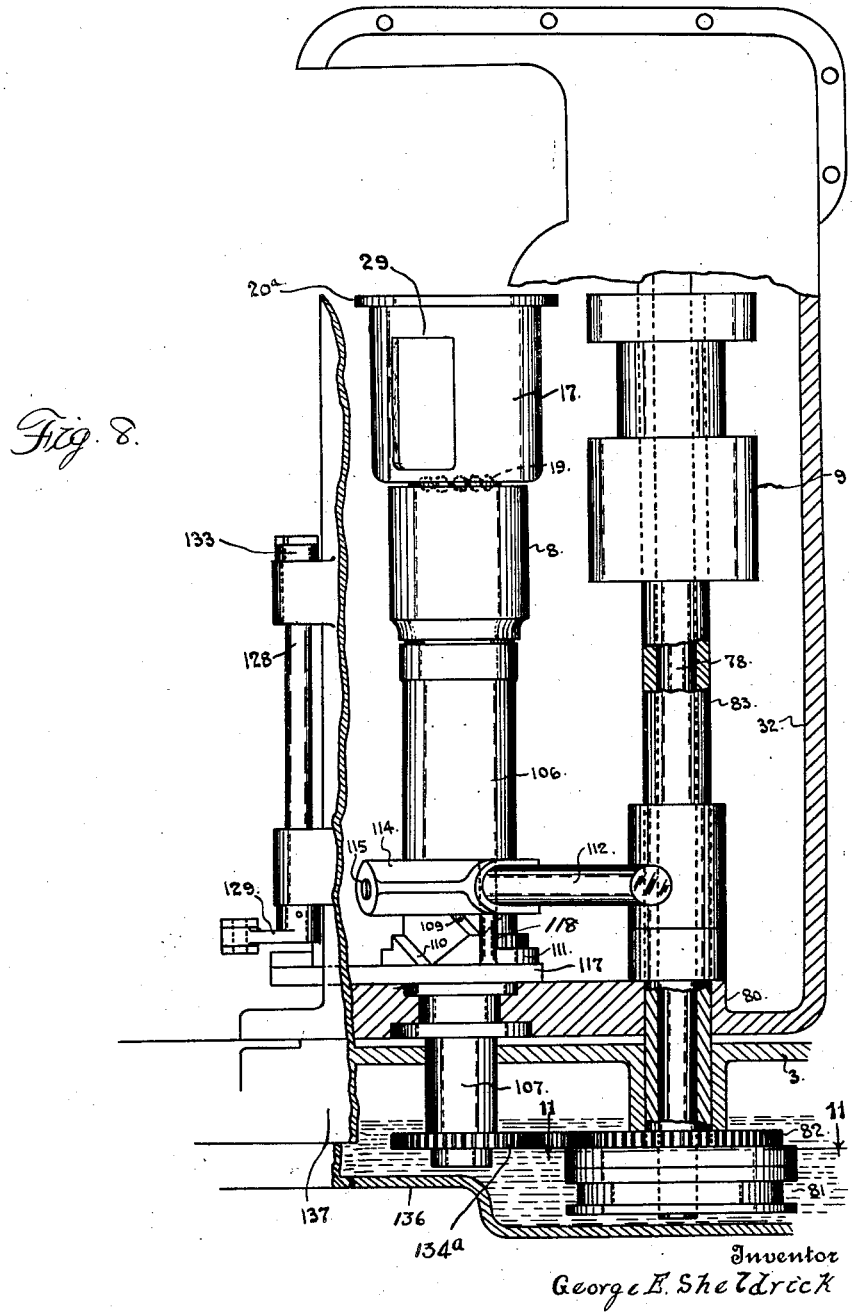

Feb. 23, 1926.  1,574,262
G. E. SHELDRICK
MAIL STAMPING MACHINE
Filed April 30, 1923   9 Sheets-Sheet 8

Inventor
George E. Sheldrick
By Whittemore, Hulbert, Whittemore, & Belknap
Attorneys Feb. 23, 1926.
G. E. SHELDRICK
1,574,262
MAIL STAMPING MACHINE
Filed April 30, 1923    9 Sheets-Sheet 9
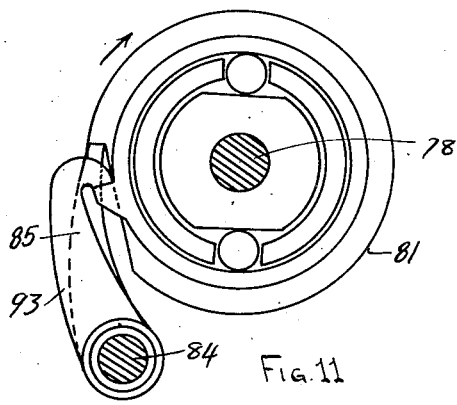
Fig. 11.
Fig. 12.
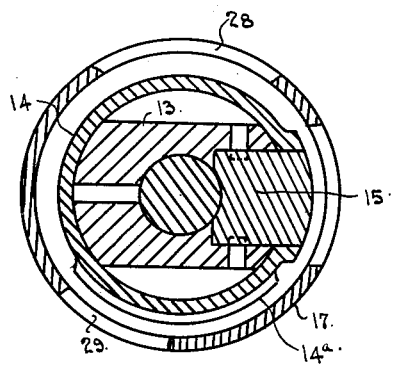
Fig. 14.
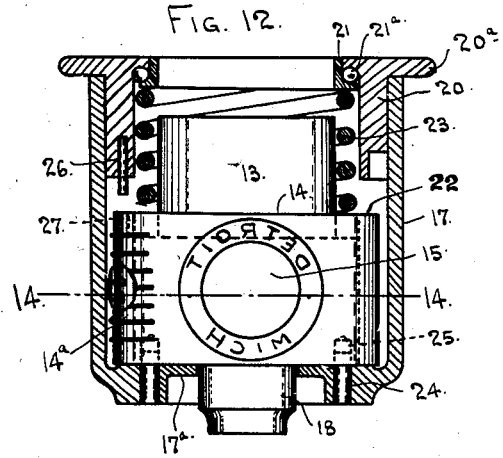
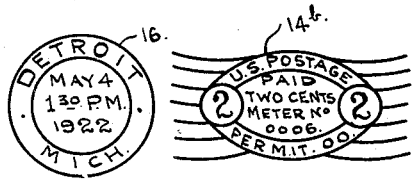
Fig. 15.
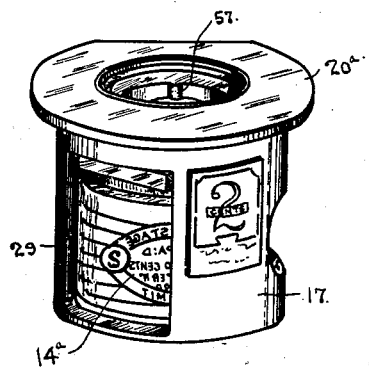
Fig. 13.
Inventor
George E. Sheldrick
By Whittemore, Hulbert, Whittemore, & Belknap
Attorneys Patented Feb. 23, 1926.

1,574,262

UNITED STATES PATENT OFFICE.

GEORGE E. SHELDRICK, OF DETROIT, MICHIGAN, ASSIGNOR, BY MESNE ASSIGNMENTS, TO PITNEY-BOWES POSTAGE METER COMPANY, OF STAMFORD, CONNECTICUT, A CORPORATION OF DELAWARE.

MAIL-STAMPING MACHINE.

Application filed April 30, 1923. Serial No. 635,617.

*To all whom it may concern:*

Be it known that I, GEORGE E. SHELDRICK, a citizen of the United States of America, residing at Detroit, in the county of Wayne and State of Michigan, have invented certain new and useful Improvements in Mail-Stamping Machines, of which the following is a specification, reference being had therein to the accompanying drawings.

This invention relates to mail stamping machines and relates more particularly to machines adapted for printing permits upon envelopes or other mail matter and further providing for an automatic termination of such printing when the number of pieces of marked mail reaches a predetermined total.

The invention is characterized by the employment of a meter carrying counting devices driven by mechanism under control of a trip actuable by the envelopes or other articles of mail in their travel through the machine, said meter being normally locked to prevent tampering with said devices and being bodily removable from the machine to permit its being taken to the proper post-office officials for resetting.

The various structural features constituting the advance in the art are hereinafter fully described and illustrated in the accompanying drawings, wherein:—

Figure 4 is a horizontal cross section showing the meter in its position of use and a portion of the drive mechanism for the registers in the meter and for the rotary printer, the section being taken on line 4—4 of Figure 2;

Figure 5 is a horizontal section on line 5—5 of Figure 3 showing primarily the platen roller in its coacting relation with the rotary printer, and a mechanism for shifting said roller to and from the printer;

Figure 6 is a horizontal section on line 6—6 of Figure 2 showing the envelope-controlled trip mechanism;

Figure 2:
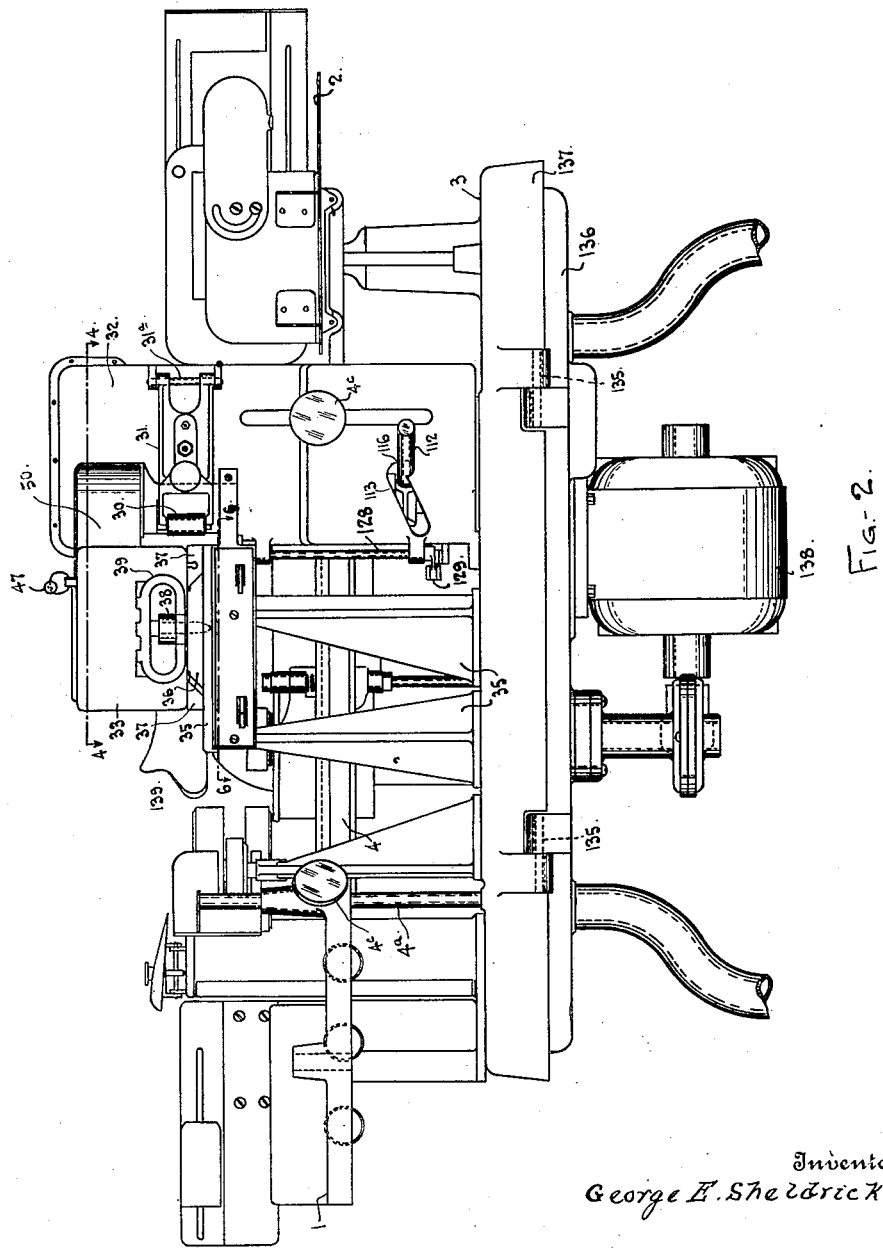
Figure 2 is a front view of the same.
Figure 9:
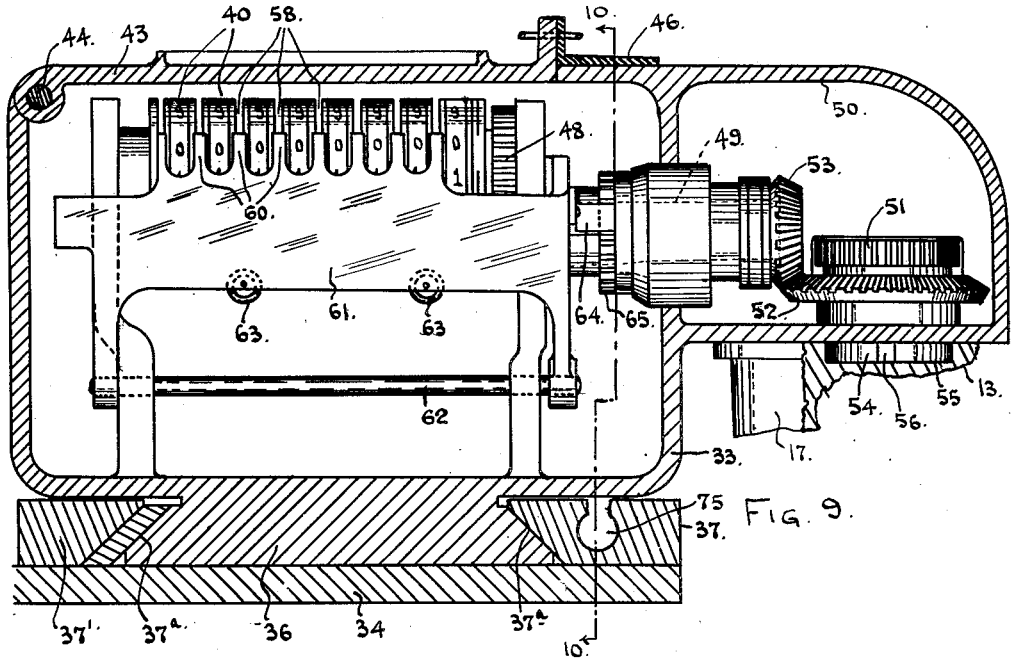
Figure 10:
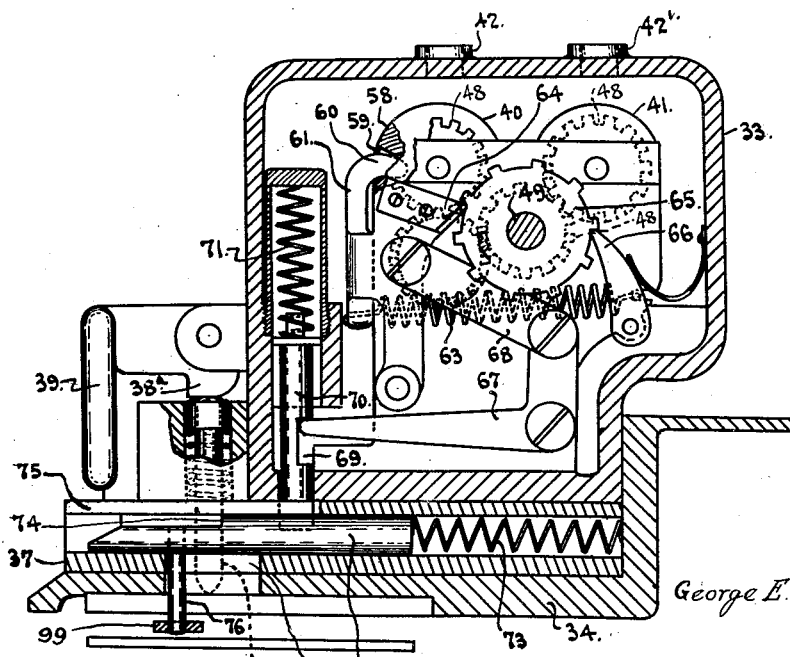

Figure 6ª is a vertical sectional detail of the above, taken on line 6ª—6ª of Figure 6;

Figure 7 is a plan view of the meter apart from the machine;

Figure 8 is an enlarged front view of certain mechanism indicated in dash lines in Figure 2;

Figure 9 is a longitudinal vertical sectional view of the meter taken on line 9—9 of Figure 4;

Figure 10 is a cross section view of the meter mounted on the machine, the section being taken on line 10—10 of Figure 9;

Figure 11 is a sectional view taken on line 11—11 of Figure 8 showing the clutch mechanism;

Figure 12 is an axial sectional view of the printing unit;

Figure 13 is a perspective view of the unit;

Figure 14 is a cross sectional view of the unit taken on line 14—14 of Figure 12;

Figure 15 illustrates the permit and postmark which are impressed upon an envelope in its travel through the described machine.

Figure 1:
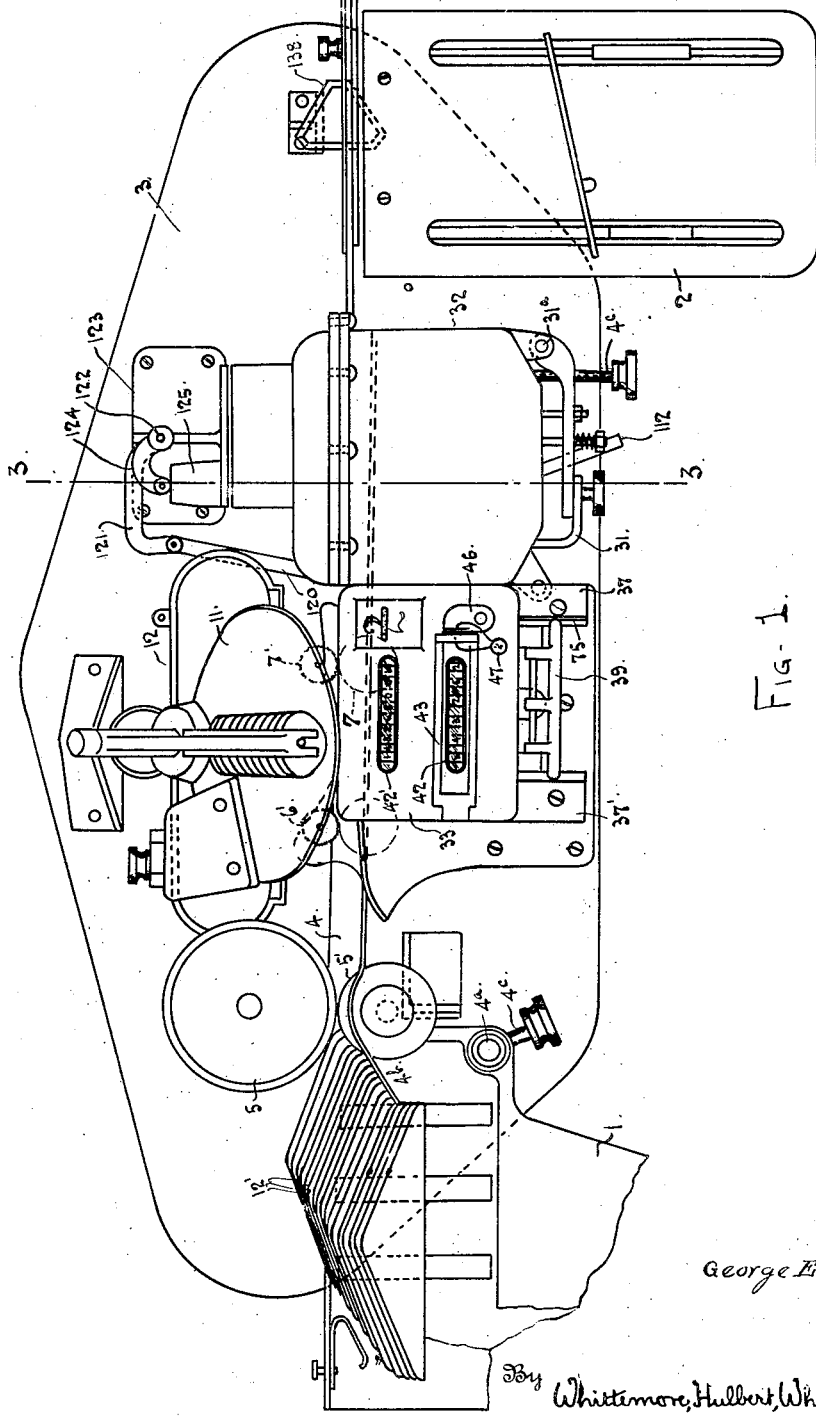
Figure 1 is a plan view of a machine equipped with the improved permit printing means.

Initially considering the machine briefly as a whole, and referring particularly to Figures 1 and 2, an initial and a final work table are indicated at 1 and 2, said tables being located at opposite ends of a base plate 3. In the illustrated embodiment of the invention, the mail matter which is handled by the machine, has the nature of envelopes and the machine functions to seal said envelopes, as well as to print permits thereupon. The envelopes are fed through the machine in succession, maintaining a substantially upright position during their entire travel and being supported and guided by a channel-shaped rail 4. Said rail has a unitary connection with the work tables 1 and 2 and the unit 1, 2 and 4 is vertically adjustable upon posts 4ª, this mounting being established by arms 4ᵇ laterally projecting from the end portions of the rail 4 and clamped upon said posts by suitable screws 4ᶜ. The travel of the envelopes through the machine from the table 1 to the table 2 is continuous, being effected by a series of pairs of feed rolls 5, 5′, 6, 6′, 7, 7′, 8, 8′, and 9, 9′. The first operation performed by the machine is moistening of the adhesive coated flaps. The specific means for accomplishing this operation is no feature of the present invention and said means may be sufficiently described as comprising an inclined driven disk element 11 the lower portion of which is immersed in a water vessel 12 while the upper portion of said element engages the gummd flaps of the envelopes 12' as the latter are advanced by the rolls 6, 6' and 7, 7'. Sealing of the flaps is accomplished jointly by the rolls 8, 8' and 9, 9' and concurrently with their engagement by the first mentioned pair of rolls, the envelopes are acted upon by a rotary printer which will now be described in detail.

Printing unit.

The rotary printer comprises a cylindrical body 13 mounted above and coaxial with the feed roll 8 but rotatively independent of said roll and a ring 14 embracing said body and having a raised portion 14ª fashioned to print an ordinary mailing permit such as is shown at 14ᵇ in Figure 15. 15 is a removable insert carried by the member 13 and projecting radially through said ring, its exposed face being circumferentially registered with the printing face 14ª of the ring and carrying type for printing an ordinary postmark, as is shown at 16 in Figure 15.

Figure 3:
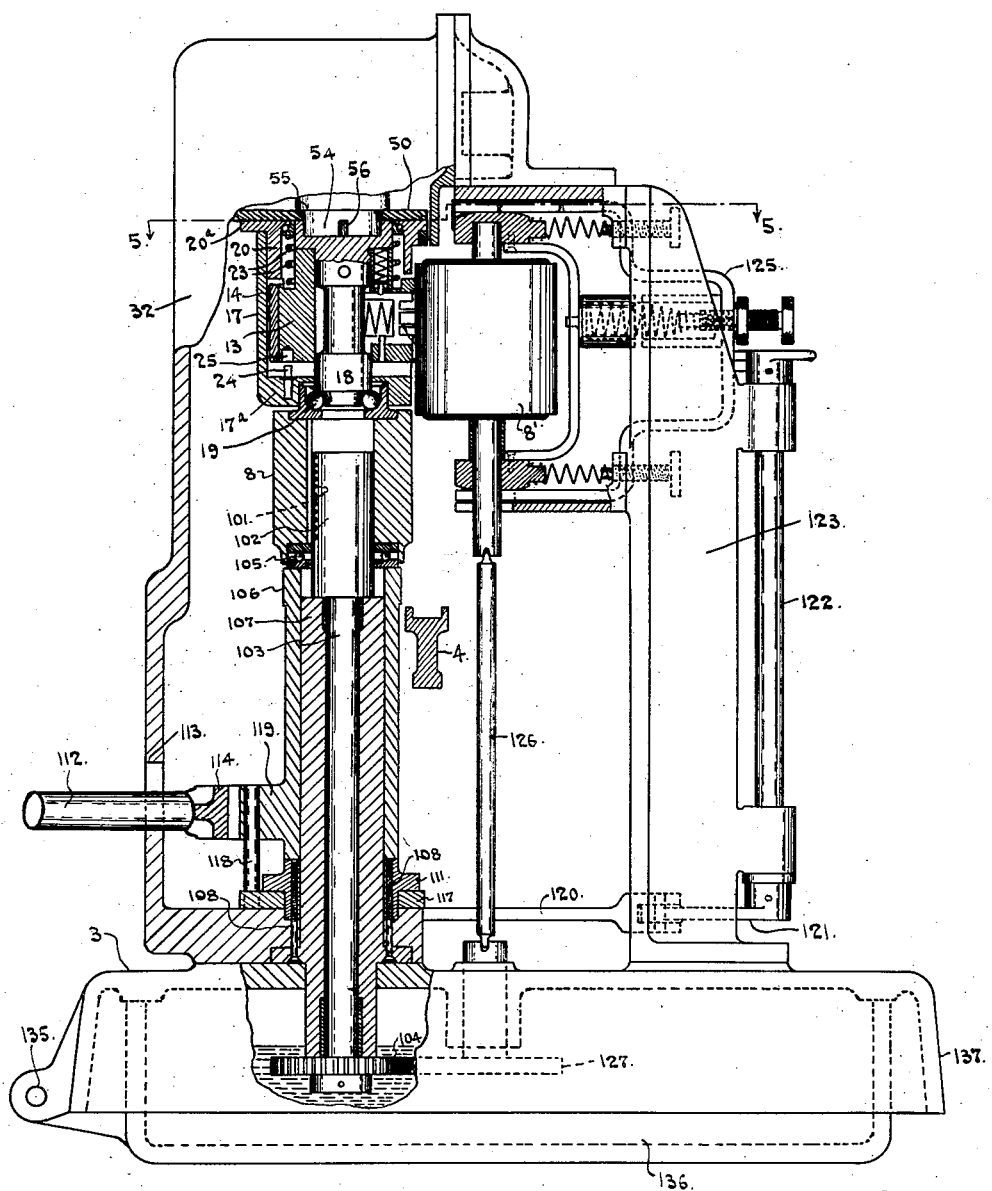
Figure 3 is a vertical cross section through the axis of the rotary permit printer, taken on line 3—3 of Figure 1.

In order to facilitate removal and replacement of the postmark printing insert, the rotary printer is adapted for bodily removal from the machine. This gives rise to necessity for a safeguard against unauthorized manual use of the printer, when out of the machine. Thus, the printer is inclosed within a cylindrical shell 17 and forms with said shell a unit assembly. Said shell has an integral lower end 17ª centrally apertured to accommodate a stub shaft 18 upon the printer. The shaft 18 is terminally coned to engage a ball thrust bearing 19 carried by the roll 8 forming an anti-friction seat for said shaft. In the upper end of the shell 17 there is permanently inserted an annular plug 20 having a flange 20ª projecting outwardly beyond the shell 17 above the latter. A ring 21 inserted in the upper portion of said plug is rotatable relative to the plug on a ball-bearing 21ª and between said ring and a shoulder 22 intermediately formed upon the body 13 there is compressed a coiled spring 23, the upthrust of which is received by the ball-bearing 21ª. The described construction is such that when the rotary printer is driven within the shell 17, the spring 23 and the ring 21, receiving the upthrust thereof, may turn freely in unison with the printer. The effort of the spring 23 is to shift the printer downwardly within the shell from its intermediate porition of use shown in Figure 3. A slight axial movement of the printer either upwardly or downwardly from said position has the effect of locking the printer fast to the shell. Thus, a pair of pins 24 upwardly projecting from the lower end of the shell will engage in sockets 25 in the printer to establish a lock upon any downward movement of the printer from its intermediate position (see Figure 12) in the shell and upward movement of the printer from said position will establish locking engagement of a pin 26 carried by the plug 20 with a socket 27 in the ring 14. Thus, if it be attempted, when the printing unit is removed from the machine, to turn the printer within the shell with the object of printing unauthorized permits, such object can be obtained only very laboriously and slowly since the printer must be retained in opposition to the spring 23 in a very definite intermediate position in the shell. Openings 28 and 29 are formed in the shell in an approximatly opposed relation for respectively permitting the printer to engage the envelopes (or other mail matter) as the same are fed through the machine and to permit an inking roll 30 to contact with the printer. 31 is an arm in which the roll 30 is journaled, said arm being pivoted at 31ª upon a housing 32 which rigidly surmounts the base plate 3 and encloses the printing unit (when the latter is positioned for use) and the drive mechanism for said unit.

Meter.

For registering the printing operations of the printer 13 there is provided a meter, the mechanism of which is enclosed within a casing 33 detachably engaging a supporting plate 34 carried by standards 35 rising from the base 3. Said casing has a projection 36 on its underside for engaging tracks 37 and 37' fast upon the supporting plate 34, said tracks having opposed undercut edge faces 37ª and the opposed edges of the projection 36 being correspondingly bevelled to engage beneath the edge portions of said tracks. Thus, the meter can be applied to the machine only in a definite position and must be rectilinearly advanced to or retracted from its position of use. 38 is a latch member for holding the meter in its position of use. (see Figure 10) said member being controlled by a cam 38ª upon a pivotal handle element 39, the latter serving also to carry the meter when removed from the machine. Within the casing 33 there are mounted two registers 40 and 41, each comprising the usual series of number wheels, the axes of said registers being parallel. The top of the casing 33 is formed with windows 42 and 42' through which the rgisters 40 and 41 may be respectively read. The window 42 is formed in a small closure 43 pivoted at one end, as indicated at 44 and extended above the register 40 to give access to said register for setting thereof. A lock 45 controls said closure, and the key-hole of said lock is normally covered by a pivotal plate 46, sealed as indicated at 47. Before said plate 46 can be turned to uncover the key-hole the seal 47 must be broken. The registers 40 and 41 are driven in common through spur gearing 48 from a shaft 49, which shaft projects into an end extension 50 of the casing 33. Within said extension there is vertically journaled a unit comprising a spur gear 51 and a bevel gear 52, the latter meshing with a bevel pinion 53 on the shaft 49. Said unit further comprises a stub shaft 54 passing through the bottom of the extension 50 and projecting slightly below said extension for driving engagement with a socket 55 formed in the top end of the printing member 13. Said stub shaft has diametrically opposed keyways 56 for engagement by keys 57 upon opposite walls of said socket. Thus, it is seen that the unit 51, 52, 54, carried by the meter, provides both for driving the rotary printer and the two registers.

With each number wheel of the register 40 there is rigidly connected a metal disk 58 formed with a peripheral notch, as indicated at 59. Upon said disks there are adapted to respectively bear corresponding fingers 60 integrally formed upon the upper end of a pawl 61 pivoted within the casing 33 as indicated at 62 (see Figure 10). The fingers 60 are proportioned to enter the notches 59 when the latter are registered with said fingers by rotation of the disks 58. The angular relation of the notches 59 with respect to the corresponding number wheels 40 is such that said notches are aligned and registered with said fingers only when each of the number wheels 40 registers naught in the corresponding window 42. When this condition exists, the pawl 61 will swing toward the register 40 responsive to a pair of coiled springs 63 engaging said pawl, and all of the disks and number wheels will be locked against rotation by engagement of the fingers 60 in the notches of said disks. Movement of the pawl 61 to its position of locking engagement with numeral wheels 40, as is shown in Figure 10, also establishes a lock for the shaft 49 against further rotation in its normal direction, this lock being effected by engagement of a dog 64 rigidly carried by the pawl 61, at one end thereof with a ratchet wheel 65 fast on said shaft. The normal direction of the shaft 49, that is to say, the direction in which it is always driven, is such as to decreasingly drive the register 40. Said shaft is constantly restrained from reverse rotation (such as would increasingly drive the register 40) by engagement of a pivotal dog 66 with the ratchet wheel 65. From the preceding description, it is seen that when the numeral wheels of the register 40 have been individually locked by the pawl 61, the drive shaft 49 for said register has also been locked. Thus, no manipulation of said register is possible until the meter has been carried to the proper official, the closure 43 unlocked by said official, and the register reset for a paid or agreed number of impressions.

As is best seen in Figure 10, a bell crank lever 67 within the casing 33 is also actuable by the pawl 61, one end of said bell crank being connected to the pawl by a link 68 and the other arm thereof being engaged in a notch 69 of a vertical plunger 70 which is downwardly urged by a coiled spring 71, and which, in a lowered limiting position, projects slightly through the bottom of the casing 33, as is indicated in dash lines in Figure 10. When the pawl 61 is swung to its register-locking position shown in Figure 10, the bell crank 67 is at the same time rocked to raise the plunger 70, as shown in said figure. In the track 37, a horizontal plunger 72 slides longitudinally of said track and is urged by a coiled spring 73 to the projected position shown in Figure 10. Said plunger is formed with a shoulder 74 which is engageable by the vertical plunger 70, when the latter is lowered, to hold the plunger 72 retracted in opposition to the spring 73. The track 37 is formed with a slot 75 in its front portion to allow engagement of the plunger 70 with the plunger 72 so that, as the meter is slid into place, the plunger 72 will be automatically retracted by such engagement. The plunger 72 carries a pin 76 depending through a slot 77 in the bottom of said track to engage a trip mechanism as will be hereinafter described.

*Printer drive mechanism and trip control for same.*

The printer is adapted to be driven from the vertical shaft 78 within the housing 32, the drive connection being established through a train of gears 79, 79ª, 79ᵇ, 79ᶜ, in the upper portion of said housing (see Fig. 4) the final gear 79ᶜ of said train being adapted to mesh with the gear 51 when the meter is in its position of use upon the machine. The shaft 78 is journaled in a bearing 80 carried by the base 1 and below said base there is provided a clutch 81 for establishing a drive connection to said shaft from a gear 82. The clutch construction is no feature of the invention and the details of said construction, therefore, will require no illustration or description. To the constantly driven clutch element there is rigidly connected the sleeve 83 which extends upwardly surrounding the shaft 78 and establishes a constant drive to the roller 9. Control of said clutch is exercised through a vertical rock shaft 84 journaled within the housing 32 and rigidly carrying upon its lower end an arm 85 (see Fig. 11) urged by a spring 86 acting upon the upper end portion of said shaft (see Fig. 5) into normal engagement with the driven element of the clutch and by such engagement normally preventing establishment of a drive connection. Upon the upper end of the rock shaft 84 there is mounted fast a control arm 87 for said shaft, which arm projects above a plate 88 upon which is mounted a trip mechanism for employing the advancing travel of the envelopes along the rail 4 for rocking said arm 87 and thereby releasing the clutch. This trip mechanism comprises a striker plate 89 pivoted upon the free end of the arm 87 and a trigger member 90 normally projecting into the path of the advancing envelopes and carried by a plate 91 pivoted at 92 upon the plate 88. When the plate 91 is rocked due to impact of an envelope with the trigger 90 a pin 92$^a$ upon said plate is adapted to engage the striker plate 89 if the latter occupies its normal position, thereby rocking the arm 87 and disengaging the arm 85 from the clutch. The clutch will then be free to establish a drive connection to the shaft 78 for a single revolution of the latter, after which a stop arm 93 on the shaft 84 will engage the driven clutch element to discontinue the drive. The striker plate 89 is urged by a spring 94 into the pivotal position shown in full lines in Figure 6 in which said plate is in the path of the pin 92$^a$. If it be desired to adjust the trip mechanism to prevent control of the clutch 81 through said mechanism a handle 95, pivoted upon the front of the plate 88, is swung to the position shown in dash lines in Figure 6 in which position a bell crank 96, pivoted beneath the plate 88, is rocked to engage a pin 97 upon said bell crank with the striker plate 89 shifting the latter to the position shown in dash lines in Figure 6, in which position the pin 92$^a$ clears said plate, when the plate 91 is rocked. A spring 98 acting upon the bell crank 96 normally maintains the position of said bell crank shown in full lines in Figure 6, in which position the pin 97 is disengaged from the striker plate 89.

The described trip mechanism is also under an automatic control by the register 40 so that when naught is registered by all the numeral wheels of said register a restraint will be automatically placed upon the tripping mechanism to prevent establishment thereby of a drive through the clutch connection responsive to the continued feeding of envelopes or the like through the machine. Thus, the pin 76, which depends from the horizontal plunger 72 (see description of meter), engages one end of a bell crank lever 99 pivoted upon the plate 88 and having its other extremity notched as indicated at 100 to engage the pin 97. When the numeral wheels 40 all register naughts with the overlying window, and the pawl 61 swings to enter the fingers 60 in the notches 59, the plunger 70 is raised disengaging the lower end thereof from the shoulder 74 of the horizontal plunger 72. Thereupon, said plunger and the pin 76 carried thereby are projected by the spring 73 and said pin 76, as will best be seen in Figure 6 rocks the bell crank 99, shifting the pin 97 (and incidentally the bell crank lever 96) to establish the restrained position of the striker plate shown in dash lines in Figure 6.

It is to be noted that the same result is accomplished in case the meter is removed from the machine prior to completion of the descending count of the register 40. Under such circumstances the movement of the meter forward upon the tracks 37 releases the plunger 72 from the plunger 70 whereby a restrained position of the striker plate 89 is established as has been described.

*Mechanism for shifting printing unit and platen roller.*

The feed roll 8 is splined as indicated at 101 to a head 102 upon the upper end of a continually driven shaft 103. (See Fig. 3.) A drive to said shaft is established by a gear 104, below the base 1, the particular drive means being no feature of the invention. The roller 8 seats through a ball bearing 105 upon the sleeve 106 which is vertically slidable and rotative upon a stationary sleeve 107 rigidly clamped to the base 1 by screws 108 and loosely receiving the driven shaft 103. The lower end of the sliding sleeve 106 is formed with a cam tooth 109, the beveled edges of which converge at a very gradual inclination. A corresponding cam depression 110 is formed in the upper edge of a collar 111 which embraces the stationary sleeve 107 just above the base and which is engaged by the clamping screws 108. The described arrangement is such that when the rotative position of the sleeve 106 is such as to enter the cam tooth 109 in the cam depression 110, the sleeve 106, roller 8 and the printing unit are all so lowered as to disengage the stub shaft 54 from the socket 55 of the printer. This position of the printing unit and its supporting parts) must be established in order to permit insertion of the meter in the machine or removal of said meter. After the meter has been positioned for use, the operator is required to rotatively shift the sleeve 106 sufficiently to shift the cam tooth 109 out of the cam depression 110 in order to raise the printing unit to its working position. Said sleeve is thus upwardly actuated a predetermined distance and acts through the roller 8 to correspondingly lift the printing unit, sufficiently to enter the stub shaft 54 in the socket 55 and thus establish a drive connection to the drum through the unit 51, 52, 54. For exercising control of the rocking and sliding sleeve 106, a lever 112 is connected to said sleeve, said lever projecting outwardly through a slot 113 in the housing 32, the inner end of said lever being formed with a yoke 114 which embraces the sleeve 106 and is pivoted thereto upon a diametrical axis as indicated at 115. It will be evident that by turning the handle lever 112 the sleeve 106 may be rocked to shift the cam tooth 109 into or out of the cam depression 110. The slot 113 is inclined to provide for the vertical movement of the lever which the cam elements 109 and 110 effect as the lever is rotated. At its upper end the slot 113 has a slight downward extension 116 which forms a pocket to receive and retain the lever 112 when the cam elements 109 and 110 are out of registration. Thus, there is no possibility of said elements shifting to a registering relation accidentally due to vibration of the machine or other causes.

With the platen roller 8' in its normal close adjacent relation to the printing unit, the flange 20ª of said unit would encounter said roller, upon an attempt to shift the unit to its lowered position. The invention therefore, provides for shifting the platen roller from the printing unit preliminary to lowering the latter. Thus, a rocker plate 117 is mounted upon the sleeve 107 between the collar 111 and the base 1. Said plate is adapted to turn in unison with the sleeve 106 by rigidly mounting an upstanding pin 118 upon said plate and loosely engaging said pin in a suitable bore formed in a lug 119 upon said sleeve. Thus, said sleeve is free to undergo its vertical travel independently of the rocker plate 117 and the latter is compelled to participate in any rocking movement of said sleeve. Said rocker plate has an arm 117ª which terminally pivotally engages one end of a link bar 120 extending transversely of the machine and having its other end pivotally engaging an arm 121 mounted fast upon the lower end of a rock shaft 122 journaled upon a standard 123. Upon its upper end, said shaft rigidly carries an arm 124 which is terminally pivotally attached to a sliding bearing 125 in which the platen roller 8' is journaled. A shaft 126 is universally coupled to the roller 8' and to a drive element 127 below the base 1 (see Fig. 3), the drive being thus independent of the sliding movement of said roller in unison with its supporting bracket 125.

The described arrangement is such that when the lever 112 is rocked to the left (see Figure 5) a corresponding rocking movement is communicated through the link 120 to the rock shaft 122 so as to withdraw the platen roller 8' from engagement with the printing unit. Also the movement of the lever 112 to the left for disengaging the printing member 13 from the driving stub shaft 54 is also utilized to exercise a restraining control upon the trip mechanism so that the latter will not be effective to establish a drive to the registers 40 and 41 after the rotary printer has been lowered out of driven engagement with the stub shaft 54. Thus, upon the housing 32 there is exteriorly journaled a rock shaft 128 which rigidly carries upon its lower extremity an arm 129 connected by a link bar 130 to one end of an arm 131 intermediately pivoted upon the housing 32 as indicated at 132 and pivotally connected at its other end to the arm 117ª. (See Fig. 5.) Upon the upper end of said shaft there is mounted fast a short arm 133 which terminally carries an upstanding lug 134 engaging the bell crank lever 96 as is best seen in Figure 6. When the shaft 128 is rocked responsive to movement of the lever 112 to the left, the shaft 128 is subjected to counterclockwise rocking movement whereby the lug 134 swings the bell crank 96 to the position shown in dash lines in Figure 6 establishing the restrained position of the striker plate 89.

*Lubrication.*

As is indicated in dash lines in Figure 2, the various gear trains through which the rotating elements of the machine are driven are mounted beneath the base 1. Said base has at its front edge hinged connections as indicated at 135 to an oil pan 136 arranged below the base and supporting the same, the base being formed with a marginal depending flange 137 which embraces said oil pan. The described arrangement is such that the gear trains 134ª are adapted to run in lubricating oil contained by the pan 136. When necessary, access may be had to the various gears below the base 1 by swinging said base with the entire mechanism carried thereby forwardly upon the hinges 135 so as to expose said gearing.

*Operation.*

Considering now the operation of the described machine as a whole, it is first necessary to adjust the rail 4 and the work tables 1 and 2 carried thereby at such a level as will properly engage the envelopes (or other mail matter) traveling through the machine upon said rail with the rotary printer. This adjustment is effected by loosening the screws 4ᶜ whereby the rail supporting arms 4ᵇ are clamped upon the posts 4ª, sliding said arms (and rails) up or down upon the posts to the required position and again tightening the clamping screws. Assuming the meter to be in proper position upon the machine and the printing unit raised and consequently in driven engagement with the stub shaft 54 and the motor 138 energized, envelopes upon which permits are to be printed, are stacked upon the feed table 1 and are consecutively delivered to the feed rolls 5, 5'. Said rolls advance the envelopes singly and in rapid succession along the rail 4. The flaps of the envelopes as the latter travel past the inclined disk 11 are moistened by said disk. In feeding between the rotary printer and the platen 8′, the flaps are pressed firmly against the bodies of the envelopes, accomplishing the initial sealing of said flaps. In advance, however, of said printer and platen, each advancing envelope encounters the trigger 90, and the latter effects a rocking of the plate 91 whereby the clutch control arm 87 is rocked, provided the striker plate 89 is in its unrestrained position. Upon counter-clockwise rocking of the shaft 84 by the arm 87, the driven element of the clutch is released by the arm 85 and a drive to the shaft 78 is established and maintained during a single revolution of said shaft. Before such revolution has been completed, the trip mechanism will have resumed its normal position and the stop arm 93 on the rock shaft 84 will have returned into engagement with the driven clutch element to halt the same when the revolution is completed. For each revolution of the shaft 78 a single revolution of the rotary printer will be effected through the train of gears 79, 79ª, 79ᵇ, 79ᶜ and 51, so that said printing member will properly contact with the envelope by which the drive to said member was established, and the permit and postmark shown in Figure 11 will be properly impressed upon said envelope. The envelope will then pass between the final sealing rolls 9 and 9′ by which it will be delivered to the final work table 2. As the envelopes accumulate upon the latter table they will be laterally shifted by a rotatively driven element 138ª. For each revolution of the rotary printer the indication of the register 41 will be increased by one, and that of the register 40 will be decreased by one. When a predetermined number of printing operations have been performed, this being the number at which the register 40 was originally set, the repeated subtractive actuations of said register will cause all of the wheels of said register to register naughts with the corresponding window 42 and to register the notches 59 of the disks 58 with the fingers 60, permitting the pawl 61 to swing, responsive to the springs 63, entering said fingers in said notches and engaging the dog 64 with the ratchet wheel 65 to prevent any further subtractive actuation of the register. At the same time, the trip mechanism, controlled by the trigger 90, will be subjected to a restraining control owing to raising of the plunger 70 as has been described. Thus, if the feeding of envelopes or the like through the machine continues after the registers have been automatically locked, said envelopes will be sealed but will not be imprinted with permits since the trip mechanism will not be effective to establish a drive to either the rotary printer or to the registers. Until the register 40 has been reset and thus released from the locking pawl 61 no further use can be made of the machine for printing permits. This follows first from the fact that the trip mechanism is not effectively responsive to the envelopes when the plunger 70 is raised and furthermore, even if this obstacle to use of the machine under such conditions were overcome, the printing unit could not be driven because the unit 51, 52, 54 to which the drive must be established is under the described conditions locked both by engagement of the dog 64 with the ratchet wheel 65 and also by the locking engagement of the pawl 61 with the numeral wheels of the register 40. When the meter is removed the drive unit 51, 52, 54 must be removed with the meter and consequently under such conditions the rotary printer cannot be driven. It is required, therefore, that the meter be taken before an authorized official who will unlock the closure 46, reset the register 40, thereby releasing said register from the locking action of the pawl 61, said closure being then again locked. The meter may be then replaced in the machine and the latter be used for printing the number of permits for which the register 40 has been set. The fact that the printing unit is a separate member from the meter permits the latter to be considerably smaller than is feasible in constructions combining a meter with a printing unit. Also the independent unitary relation of the printing unit to the meter permits said unit to be more readily handled for the purpose of changing the type carried by the insert 15. At intervals of several hours a change of this type is necessary to produce the proper time on the printed postmark and the insert must, furthermore, be changed each day to correct the date.

An important feature of the invention is the very positive prevention of unauthorized use of the printing unit for permit printing when said unit is removed from the machine. The first obstacle to such use lies in the fact that the impression member of the rotary printer does not register with the printing window 28 in the position occupied by the rotary printer within the shell 17 when the unit is removed from the machine. That is to say, the clutch assures a definite stopping position for the printing unit, which position registers the pins 24 and 26 with the sockets 25 and 27 but does not register the impression member of the printer with the printing window. Consequently, when the printing unit is lowered preliminary to removal of said unit from the machine, the resulting expansion of the spring 23 engages the lowermost pins 26 in the corresponding sockets 27 locking the printer to the shell with the impression member facing an imperforate portion of the shell. If, by application of sufficient force, the printing member is shifted axially within the shell to establish the intermediate position of said member in which position the printer is rotatable in the shell, the printer may be rotated but will tend to lock each time the pins 26 and sockets 27 are registered. Thus, rotation of the rotary printer within the shell can be effected only very laboriously. Neither of the openings 28 or 29 are of sufficient circumferential extent to fully expose the impression member of the printer at any time.

The described machine may be used merely for sealing envelopes without necessity of removing either the meter or printing member since by merely adjusting the lever 95 (Figure 6) to the right a restraining control is placed upon the trip mechanism so that the same is not effectively responsive to the advancing envelopes.

It will be noted that the meter, as shown in Figures 1 and 7 carries the indication "2 cents," this marking being of a size to be readily seen. Similarly meters intended for printing stamps (permits) of other denominations will be marked to indicate such denominations. If it were possible to cooperatively mount in the described machine a meter of one denomination as for example, the illustrated 2 cent meter, and a printing unit adapted to mark a higher denomination permit upon the mail matter, there would result a possibility for fraudulent use of the machine. Such a use, however, is avoided by differently proportioning the stub shafts of the various meters, and correspondingly differentiating the sockets 55 of the various printing units, so that a driving engagement may be established between a meter and a printing unit only if they correspond as regards the denomination of the permit to be printed.

What I claim as my invention is:

1. In a mail marking machine, a removable and replaceable printing member, and a removable and replaceable register for registering the operations of said printing member; said printing member and said register being independently removable from and replaceable in the machine.

2. In a mail marking machine, a printing member and a register for the operations of said member independently removable from the machine; means for advancing mail toward the printing member; and means automatically controlling operation of the printing member by the advance of mail toward the same.

3. In a mail marking machine, a printing member and a meter independently removable from the machine, said meter comprising a casing, a device within said casing for registering operations of the printing member, and further comprising a power transmission element for the printing member.

4. In a machine as set forth in claim 3, means carried by the meter for actuating said register from said power transmission element.

5. In a machine as set forth in claim 3, a drive element permanently mounted upon the machine and having driving engagement with said power transmission element carried by the meter when the latter is in position of use upon the machine.

6. In a machine as set forth in claim 3, means permanently carried by the machine for shifting the printing member into and out of driving engagement with said power transmission element.

7. In a mail marking machine, a printing member rotatable in the machine, a meter carrying means for registering revolutions of the printer, the meter being removably mounted in the machine, and the printing member being axially movable into and out of operative engagement with said registering means.

8. In a mail marking machine, drive mechanism permanently carried by the machine, a printing member actuable by said drive mechanism and removable from the machine, and a register for the operations of the printer removable from the machine independently of the printing member.

9. In a machine as set forth in claim 8, a removable meter providing a casing for the register and drive mechanism for the register carried in said casing and operatively engageable with the printing member in the machine.

10. A machine as set forth in claim 7, the printing member and meter being independently removable from the machine.

11. In a machine as set forth in claim 7, manually operable means for shifting the printer axially to connect it with and disconnect it from said registering means.

12. In a machine as set forth in claim 7, a cam element rotative about the axis of the printing member for shifting the latter axially.

13. In a machine as set forth in claim 12, a slotted housing enclosing said printing member and cam element, and a control member for the cam element projecting through the seat of said housing.

14. In a machine as set forth in claim 12, a rotative actuating member for said cam element, and means for restraining said actuating member from rotation in one limiting position thereof.

15. A printing unit comprising a casing having a window, of a printing member journaled within said casing and movable axially therewithin, an impression member carried by said printing member periodically registerable with said window through rotation of the printing member, and means locking the printing member to the casing in one limiting position of its sliding movement.

16. In a printing unit as set forth in claim 15, means within the casing yieldably urging the printing member toward said limiting position.

17. In a printing unit as set forth in claim 15, means locking the printing member to the casing in either of its limiting positions.

18. In a printing unit as set forth in claim 15, a projection upon an end of the casing engageable with a socket in the corresponding end of the printing member in one limiting position of the latter.

19. In a printing unit as set forth in claim 15, a spring within the casing urging the printing member axially to one of its limiting positions, and projections upon the ends of the casing engageable with the printing member and restraining the same from rotation except in an intermediate position of its axial movement.

20. In a printing machine, the combination with a casing, of a printing member having a unitary connection with said casing and axially movable within the casing, means for locking the printing member to the casing in one limiting position of the printing member, a roller coaxial with the printing member providing a seat therefor, and means for actuating said roller axially to control said locking means.

21. In a printing machine as set forth in claim 20, means for holding the casing stationary in the machine, a drive element for the roller, and means carried by the machine for actuating the roller axially to shift the printing member into or out of latch engagement with its casing.

22. In a mail marking machine, a unit removable from said machine, comprising a printing member having a removable insert for imprinting a post mark, and a casing in which said member is journaled having a window through which said member is inked, a window through which impressions are made from said member, and a window for removal and insertion of said insert, the latter window substantially conforming in size to the insert.

23. In a registering device, driving and driven members, means for positively advancing work to the driven member, a register for operations of the driven member mounted for removal from its position of use independently of said driven member and a trip mechanism normally actuable by the advancing work to control the drive to said driven member, said mechanism being responsive to removal of the register from its position of use by a cessation of effective response to advance of the work.

24. In a registering device as set forth in claim 23, additional means annually operable for establishing a non-controlling position of the trip mechanism.

25. In a mail marking machine, a printing member, drive means for said member, a clutch controlling the drive to said member, trip mechanism controlling said clutch and operable by mail matter moving through the machine, a meter removably mounted upon the machine and carrying means for registering operations of the printing member, and a control device for said trip mechanism rendering the same inactive when the meter is removed from the machine.

26. In a mail marking machine, a drive element, a rotative printing member axially movable into and out of engagement with said drive element, means for advancing mail toward said printing member, a trip mechanism actuable by the advancing mail to control the actuation of said drive element, and a common means for shifting said printing member axially into and out of engagement with said drive element and for controlling said trip mechanism.

27. In a machine as set forth in claim 26, auxiliary means independent of axial movement of the printing member for restraining the trip mechanism from effective actuation by the advancing mail.

28. In a machine as set forth in claim 26, a device for registering operations of the printing member, and means effective in a predetermined registering position of said device for restraining said trip mechanism from effective actuation by the advancing mail.

29. In a mail marking machine, a printing member and a coacting platen member, the latter being movable to and from the former, and the former being movable transversely to the movement of the platen, and a common means for effecting the two specified movements.

30. In a mail marking machine, a rotative printing member, a coacting platen roller, and a common means for shifting said printing member axially and for moving said platen roller to and from the printing member.

31. In a mail marking machine, a driving member, a rotative printing member axially movable into and out of engagement with said driving member, a platen roller coacting with said printing member, and a common means for shifting said platen member to and from the printing member and moving the printing member axially.

32. In a machine as set forth in claim 30, a substantially fixed cam element, a cam element rotative coaxially with the printing member and actuable along the axis thereof, upon rotation, by said fixed cam element, an actuating element for the platen member rotative about said axis but fixed as regards movement along said axis, and means for rotating the said actuating element by the rotative cam element.

33. In a machine as set forth in claim 32, the platen actuating element being rotative in unison with the rotative cam element by a pin fixedly carried by one of said elements slidably engaging the other of said elements.

34. In a machine as set forth in claim 30, a rock shaft parallel to the axis of the printing member, means carried thereby shifting the platen roller to and from the printing member when said shaft is rocked, and a common means for rocking said shaft and axially moving the printing member.

35. In a mail marking machine, a printing member, a device for registering the operations of said member, a pivotal element angularly movable responsive to movement of the registering device to a predetermined registering position, a drive shaft for the registering device, a ratchet wheel upon said shaft, and a pawl engageable with said wheel through angular movement of said pivotal element.

36. A machine comprising a base, a support to which said base is hinged, drive mechanism carried by said base thereneath, accessible by swinging said base laterally upon its hinges.

37. A machine as set forth in claim 36, said support forming an oil pan for lubricating said drive mechanism.

38. A machine as set forth in claim 37, the base being marginally downwardly flanged and normally enclosing said oil pan.

39. In a mail marking machine, a set of interchangeable printing members removable from the machine and adapted for making different impressions, and a corresponding set of registering devices for counting the operations of said printing members, and engageable drive elements upon each printing member and the corresponding register, said elements differing for each different printing member to guard against use of any of said printing members with the register corresponding to some other printing member.

40. A mail marking machine as defined in claim 39, each printing member and the corresponding register having engageable male and female drive elements, said elements varying in size for each different printing member.

41. In a mail marking machine, a printing unit and a counting device independently detachable from the machine and coacting driving and driven parts carried respectively by said detachable members, predetermined in size to coact one with the other.

42. In a mail marking machine, a printing unit and a meter unit independently detachable from the machine, said meter unit being marked to indicate a certain denomination of permit, and including a counting device and a transmission element for driving said counting device and the print unit, said element being of dimensions predetermined to establish a drive only to a unit for printing a permit of said denomination.

43. In a registering device, driving and driven members, means for positively advancing work to the driven member, a register for operations of the driven member removably mounted in its position of use, a trip mechanism normally operable by the advancing work to control the drive to said driven member, a control element for said trip mechanism retracted by the register in the position of use of the latter and adapted when projected to restrain the trip mechanism from establishing the drive, and means projecting said control member upon its release by the register.

44. In a registering device, driving and driven members, means for positively advancing work to the driven member, a register for operations of the driven member removably mounted in its position of use, a trip mechanism normally actuable by the advancing work to control the drive to said driven member, and means effective in a predetermined position of the registering device for restraining said trip mechanism from effective response to the advancing work.

45. In a registering device, driving and driven members, means for positively advancing work to the driven member, a register for operations of the driven member removably mounted in its position of use, a trip mechanism normally actuable by the advancing work to control the drive to said driven member, a guide element engageable by the register in its movement into and out of its position of use, a plunger mounted in said guide element retractable by the register as the latter is moved to its position of use and acting upon said trip mechanism to establish when projected a non-controlling position of said mechanism, and means yieldably urging the plunger to projected position.

46. In a registering device, driving and driven members, means for positively advancing work to the driven member, a register for operations of the driven member removably mounted in its position of use, a trip mechanism normally actuable by the advancing work to control the drive to said driven member, a control member for the trip mechanism, a spring urging said member to a position rendering the trip mechanism ineffective to exercise control, said register in its position of use restraining said control member from response to said spring.

47. In a mail marking machine, a printing member, drive means for said member, a clutch controlling the drive to said member, a trip mechanism controlling said clutch and operable by mail matter moving through the machine, a meter removably mounted upon the machine and carrying means for registering operations of the printing member, a guide element for the meter in its movement into and out of its position of use, a plunger slidable in said guide element and retractable by the meter as the latter is moved to its position of use, means yieldably urging the plunger to projected position, and an element carried by the plunger acting on the trip mechanism to negative control of the clutch by said mechanism when the plunger is projected.

48. In a mail marking machine, a drive element, a rotative printing member axially movable into and out of engagement with said drive element, means for advancing mail toward said printing member, a trip mechanism actuable by the advancing mail to control the actuation of said drive element, a common means for manually shifting said printing element out of engagement with said driving element and for restraining said trip mechanism from effective actuation by the advancing mail.

49. In a mail marking machine, a drive element, a rotative printing member axially movable into and out of engagement with said drive element, means for advancing mail toward said printing member, a trip mechanism actuable by the advancing mail to control the actuation of said drive element, a platen roller coacting with said printing member, and a common means for shifting said platen roller clear of the printing member, shifting the printing element out of engagement with said driving element and restraining said trip mechanism from effective actuation by the advancing mail.

50. In a mail marking machine, a drive element, a rotative printing member axially movable into and out of engagement with said drive element, means for advancing mail toward said printing member, a trip mechanism actuable by the advancing mail to control the actuation of said drive element, a device for registering operations of the printing member, said device being removable from the machine, and means responsive to removal of said device from its position of use for restraining said trip mechanism from effective actuation by the advancing mail.

51. In a mail marking machine, a printing member, a register for the operations of said member, and a drive element for said printing member, said printing member and register being independently removable from the machine, and said drive element being carried by said register and removable therewith.

52. In a mail marking machine, a printing member, a register for the operations of said member, and a common drive element for said printing member and register, said printing member and register being independently removable from the machine, and said drive element being carried by the register and removable therewith.

In testimony whereof I affix my signature.

GEORGE E. SHELDRICK.